(12) United States Patent
Masuda

(10) Patent No.: US 12,513,439 B2
(45) Date of Patent: Dec. 30, 2025

(54) PATH SWITCHING DEVICE, OPTICAL TRANSMISSION SYSTEM, AND PATH SWITCHING METHOD

(71) Applicant: NEC Corporation, Tokyo (JP)

(72) Inventor: Akira Masuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 280 days.

(21) Appl. No.: 18/484,882

(22) Filed: Oct. 11, 2023

(65) Prior Publication Data
US 2024/0137673 A1 Apr. 25, 2024
US 2024/0236530 A9 Jul. 11, 2024

(30) Foreign Application Priority Data
Oct. 20, 2022 (JP) .............................. 2022-168055

(51) Int. Cl.
*H04Q 11/00* (2006.01)
*H04B 10/077* (2013.01)
*H04B 10/294* (2013.01)
*H04B 10/50* (2013.01)

(52) U.S. Cl.
CPC ..... *H04Q 11/0005* (2013.01); *H04B 10/0773* (2013.01); *H04B 10/294* (2013.01); *H04B 10/506* (2013.01); *H04Q 2011/0041* (2013.01)

(58) Field of Classification Search
None
See application file for complete search history.

(56) References Cited

FOREIGN PATENT DOCUMENTS

| JP | 2000-332686 A | 11/2000 | |
|---|---|---|---|
| JP | 2001-285323 A | 10/2001 | |
| JP | 2002-062217 A | 2/2002 | |
| KR | 100917562 B1 * | 9/2009 | ........... H04B 10/032 |

* cited by examiner

Primary Examiner — David W Lambert

(57) ABSTRACT

Provided is a path switching device including a wavelength separator that wavelength-separates signal light and monitoring light having a wavelength different from a wavelength of the signal light, a signal light path switcher that switches a path of the signal light, and a monitoring light path controller that controls a path of the monitoring light, wherein the monitoring light path controller sets a path of the monitoring light to one path regardless of a switching state of a path of the signal light.

13 Claims, 12 Drawing Sheets

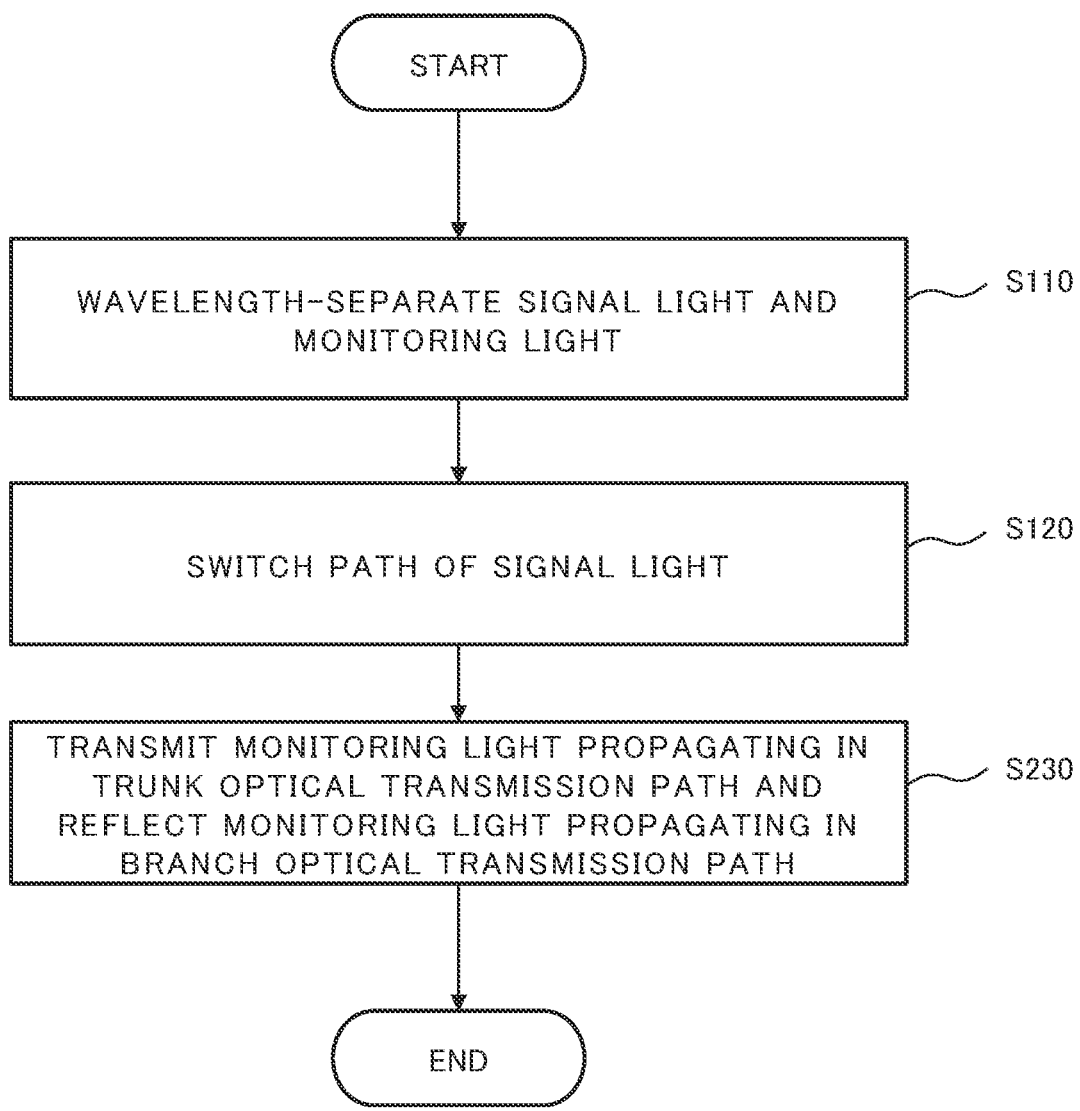

PATH SWITCHING DEVICE, OPTICAL TRANSMISSION SYSTEM, AND PATH SWITCHING METHOD

This application is based upon and claims the benefit of priority from Japanese Patent Application No. 2022-168055, filed on Oct. 20, 2022, the disclosure of which is incorporated herein in its entirety by reference.

TECHNICAL FIELD

The present disclosure relates to a path switching device, an optical transmission system, and a path switching method.

BACKGROUND ART

As an optical transmission system such as a submarine optical transmission system, there has been known a system that monitors a state of an optical transmission path including an optical repeater, an optical fiber, and the like by using level fluctuation in monitoring light in a specific wavelength band. One example of such a system that monitors an optical transmission path is described in PTL 1 (Japanese Unexamined Patent Application Publication No. 2002-062217).

In the related optical transmission path monitoring system described in PTL 1, a wavelength different from a signal light wavelength of a wavelength multiplexing optical transmission system is allocated to probe light of an optical time domain reflectometer (OTDR), and an optical transmission path is monitored. In this case, it is assumed that different wavelengths of the probe light of the OTDR are allocated to the optical fiber and the optical repeater.

The related optical transmission system is described while giving a configuration including a terminal station device provided to each of a station A, a station B, and a station C, and a branch device, as an example. Herein, a section between the station A and the station B is a trunk section, and a section between the station C and the branch device is a branch section.

As illustrated in FIG. 11A, in a configuration in which a section between a branch device 10 and the station C (branch station) is redundant, communication between the station A and the station B, communication between the station A and the station C, and communication between the station B and the station C can be established via the branch device 10. In other words, the station C can communicate with both the station A and the station B via the branch device 10.

Meanwhile, in a configuration in which the section between the branch device 10 and the station C (branch station) is not redundant as in an example illustrated in FIG. 11B, only communication between the station A and the station B and communication between the station B and the station C can be established. In other words, the station C does not communicate with the station A, and only communicates with the station B. With reference to FIG. 12, description is made on a case in which a state of an optical transmission path is monitored with monitoring light being wavelength-multiplexed with signal light in the optical transmission system thus configured.

In an optical transmission system illustrated in FIG. 12, branch devices 10A, 10B, 10C, and 10D form a ring network. Further, the branch devices 10A, 10B, 10C, and 10D are connected to terminal station devices provided in a station A, a station B, a station C, and a station D. Herein, for example, when the station B communicates with the station A with signal light S11, the branch device 10B cannot be in a state that communication between the station B and the station C is established, and hence monitoring light S12 cannot be transmitted between the station B and the station C. Thus, a state of an optical transmission path between the station B and the station C cannot be monitored. Similarly, a state of an optical transmission path between the station A and the station D cannot be monitored. In other words, a section of the optical transmission path that cannot be monitored with the monitoring light S12 (X1 and X2 in FIG. 12) occurs depending on a selection state of the transmission path of the signal light S11.

In this manner, there arises a problem that a section of an optical transmission path that cannot be monitored with monitoring light occurs depending on a configuration of an optical transmission system.

An object of the present disclosure is to provide a path switching device and a path switching method that solve the above-mentioned problem that a section of an optical transmission path that cannot be monitored with monitoring light occurs depending on a configuration of an optical transmission system.

SUMMARY

According to one aspect of the present disclosure, a path switching device includes a wavelength separator that wavelength-separates signal light and monitoring light having a wavelength different from a wavelength of the signal light, a signal light path switcher that switches a path of the signal light, and a monitoring light path controller that controls a path of the monitoring light, wherein the monitoring light path controller sets a path of the monitoring light to one path regardless of a switching state of a path of the signal light.

According to one aspect of the present disclosure, a path switching method includes wavelength-separating signal light and monitoring light having a wavelength different from a wavelength of the signal light, switching a path of the signal light, and controlling a path of the monitoring light, wherein the controlling a path of the monitoring light includes setting a path of the monitoring light to one path regardless of a switching state of a path of the signal light.

BRIEF DESCRIPTION OF THE DRAWINGS

Exemplary features and advantages of the present disclosure will become apparent from the following detailed description when taken with the accompanying drawings in which:

FIG. 10 is a flowchart for describing the path switching method of the present disclosure;

EXAMPLE EMBODIMENT

Example embodiments of the present disclosure will be described below with reference to the drawings.

First Example Embodiment

Figure 1:
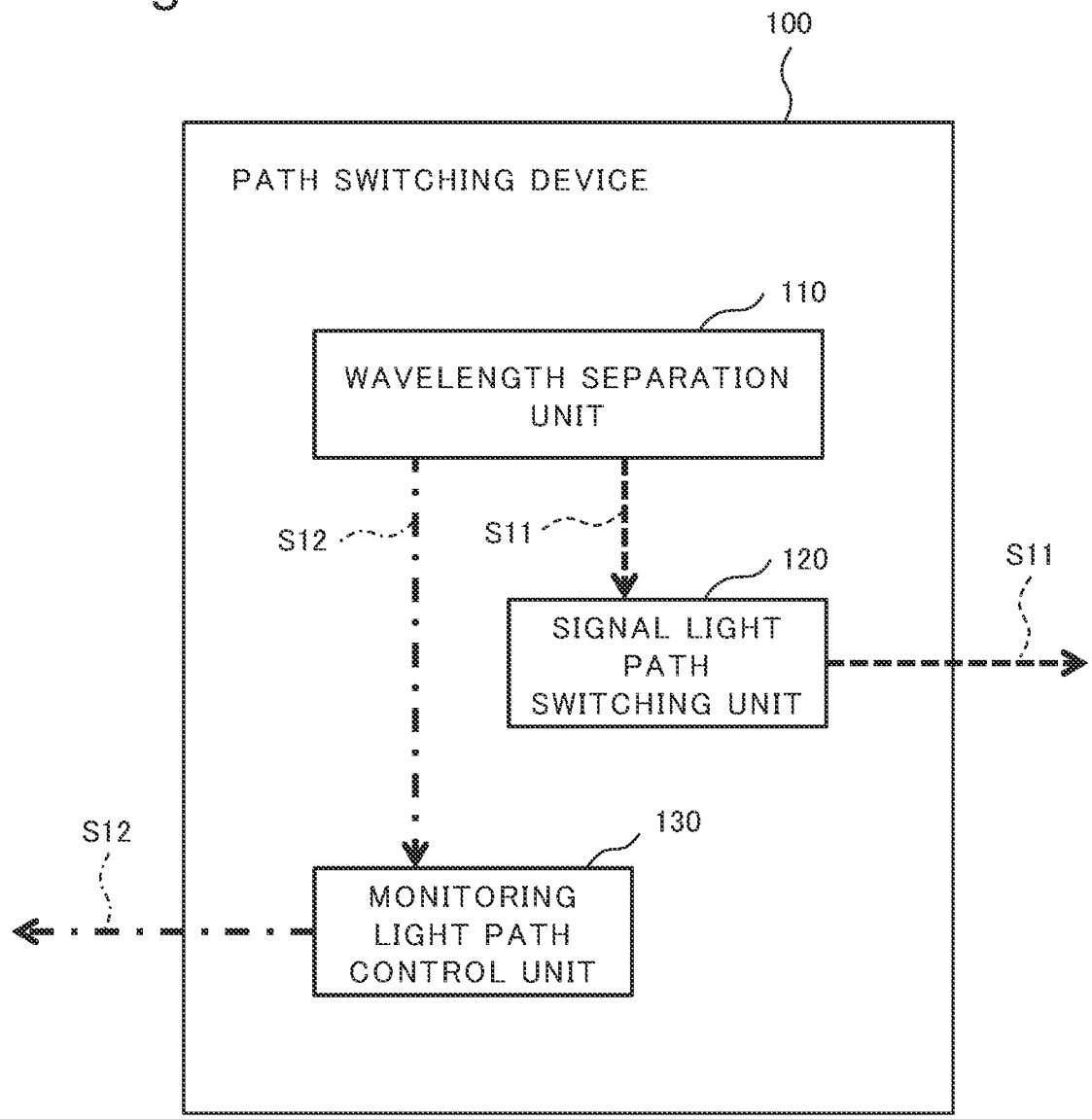
FIG. 1 is a block diagram illustrating a configuration of a path switching device of the present disclosure.

Firstly, a first example embodiment of the present disclosure is described. FIG. 1 is a block diagram illustrating a configuration of a path switching device 100 according to the present disclosure. The path switching device 100 includes a wavelength separator 110, a signal light path switcher 120, and monitoring light path controller 130. The path switching device 100 is suitably used in a submarine optical transmission system.

The wavelength separator 110 wavelength-separates signal light S11 and monitoring light S12 having a wavelength different from a wavelength of the signal light S11. The signal light path switcher 120 switches a path of the signal light S11. Further, the monitoring light path controller 130 controls a path of the monitoring light S12. Herein, the monitoring light path controller 130 sets the path of the monitoring light S12 to one path regardless of a switching state of the path of the signal light S11.

In this manner, the path switching device 100 according to the present example embodiment is configured to wavelength-separate the signal light S11 and the monitoring light S12 and set the path of the monitoring light S12 to one path regardless of a switching state of the path of the signal light S11. Thus, according to the path switching device 100 of the present example embodiment, the optical transmission path can be monitored regardless of a selection state of the transmission path of the signal light in the optical transmission system.

Herein, in general, an optical filter may be used as the wavelength separator 110. Further, in general, an optical switch may be used as the signal light path switcher 120. In general, the monitoring light S12 is an optical pulse. A state of the optical transmission path can be monitored by using level fluctuation in the optical pulse.

Figure 2:
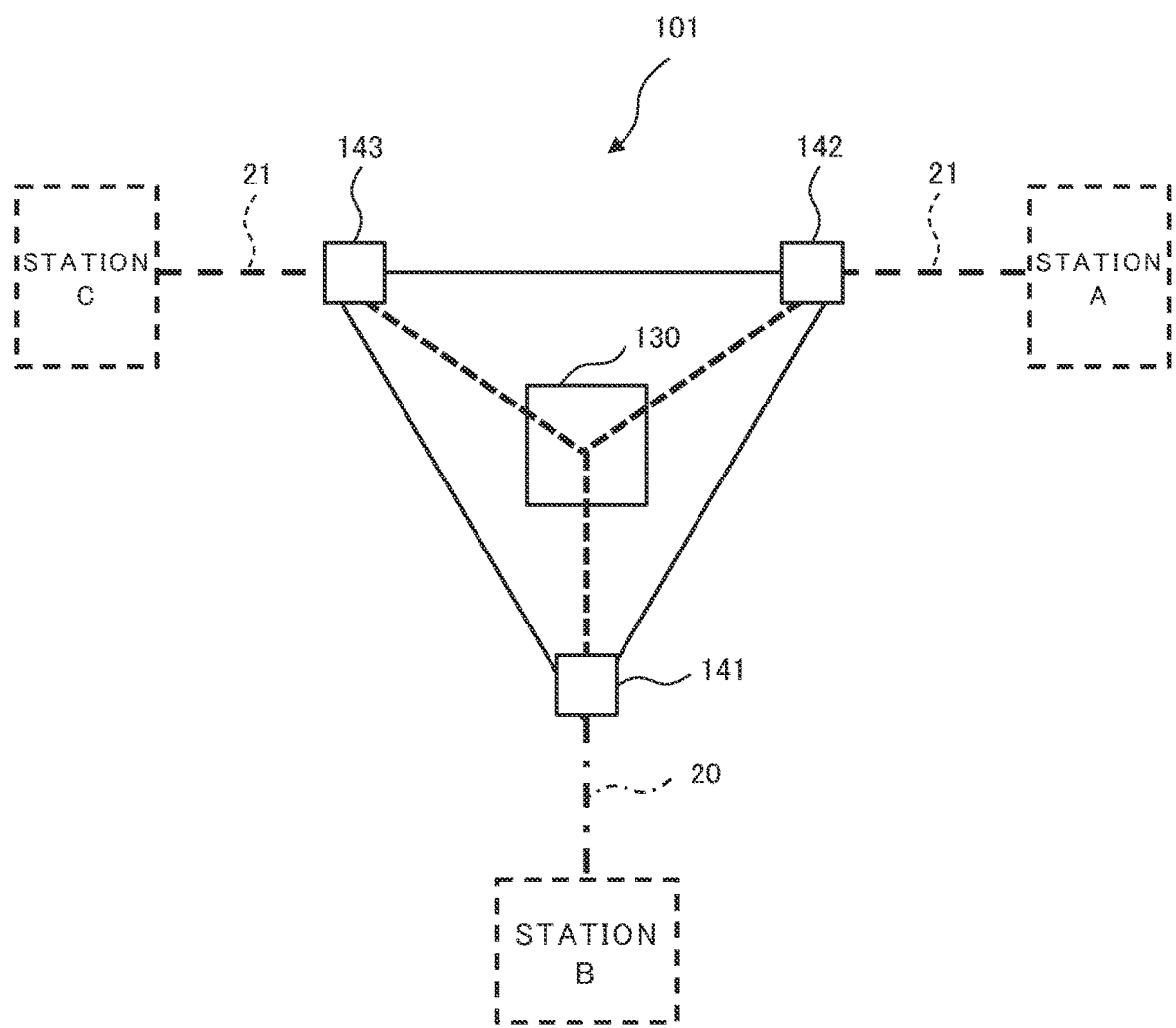
FIG. 2 is a diagram schematically illustrating a configuration of the path switching device of the present disclosure.

The path switching device according to the present example embodiment is further described in detail. FIG. 2 schematically illustrates a path switching device 101 according to the present example embodiment. In FIG. 2, illustration of the wavelength separator 110 and the signal light path switcher 120 that are illustrated in FIG. 1 is omitted.

The path switching device 101 further includes a first connector 141, a second connector 142, and a third connector 143. Herein, the first connector 141 is connected to a branch optical transmission path 20. The second connector 142 is connected to one end of a trunk optical transmission path 21. Further, the third connector 143 is connected to another end of the trunk optical transmission path 21.

In this case, the monitoring light path controller 130 may be configured to set the path of the monitoring light to any one of a first path, a second path, and a third path. Herein, the first path is a path between the first connector 141 and the second connector 142. The second path is a path between the first connector 141 and the third connector 143. Further, the third path is a path between the second connector 142 and the third connector 143.

The monitoring light path controller 130 may be configured to include an optical coupler that connects any one of the second connector 142 and the third connector 143 and the first connector 141 to each other. In general, a coupler may be used as the optical coupler.

Figure 3:
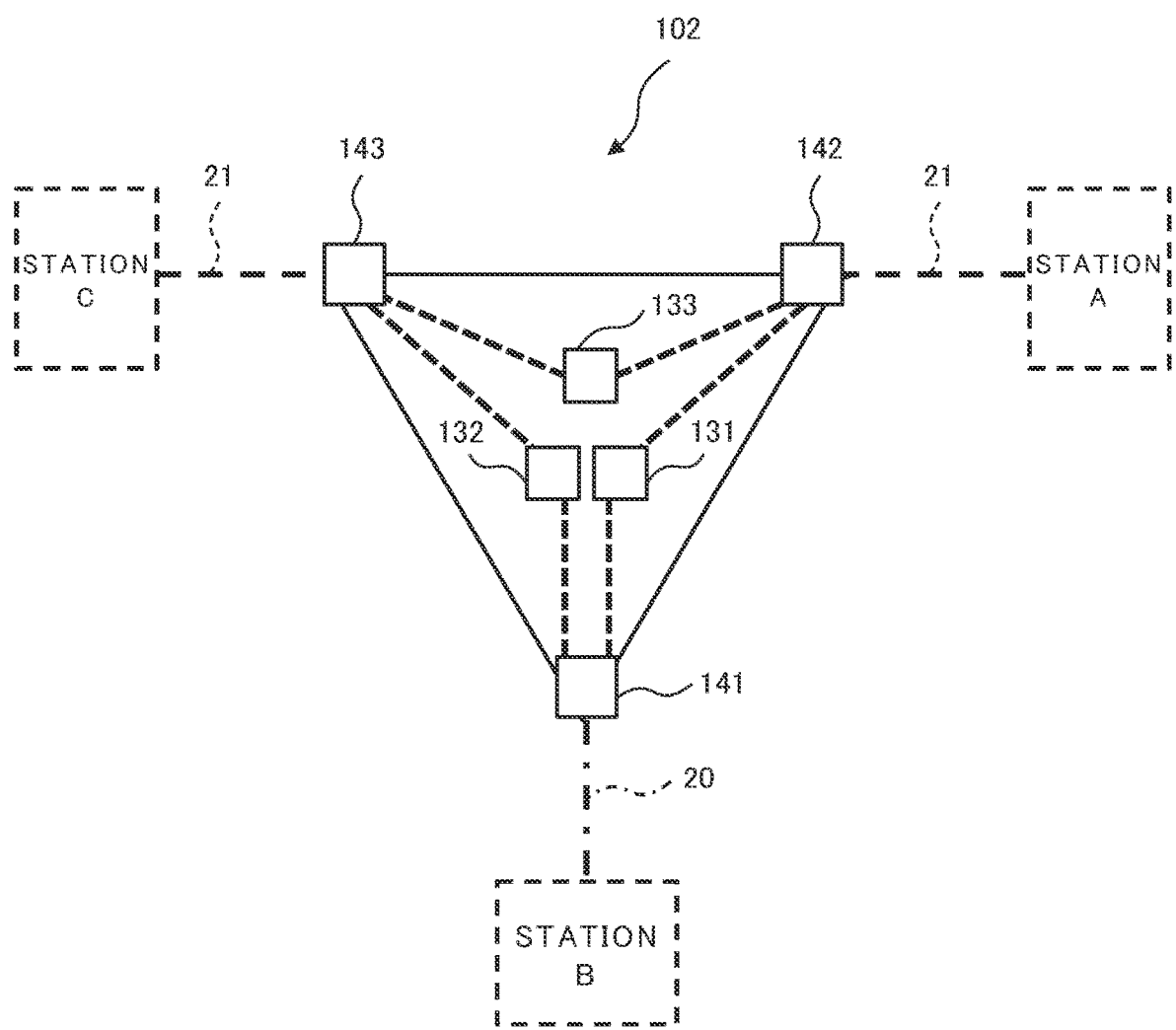
FIG. 3 is a diagram schematically illustrating another configuration of the path switching device of the present disclosure.

Further, as in a path switching device 102 illustrated in FIG. 3, the monitoring light path controller 130 may be configured to include variable attenuators 131, 132, and 133. The variable attenuators 131, 132, and 133 control the path of the monitoring light to any one of a transmitting state for transmitting the monitoring light and a blocking state for blocking the monitoring light. Herein, the variable attenuators 131 and 132 set any one of the first path and the second path to the transmitting state, and another one of the first path and the second path to the blocking state. Further, the variable attenuator 133 may be configured to set the third path to the blocking state. In general, variable attenuators may be used as the variable attenuators 131, 132, and 133.

Figure 4:
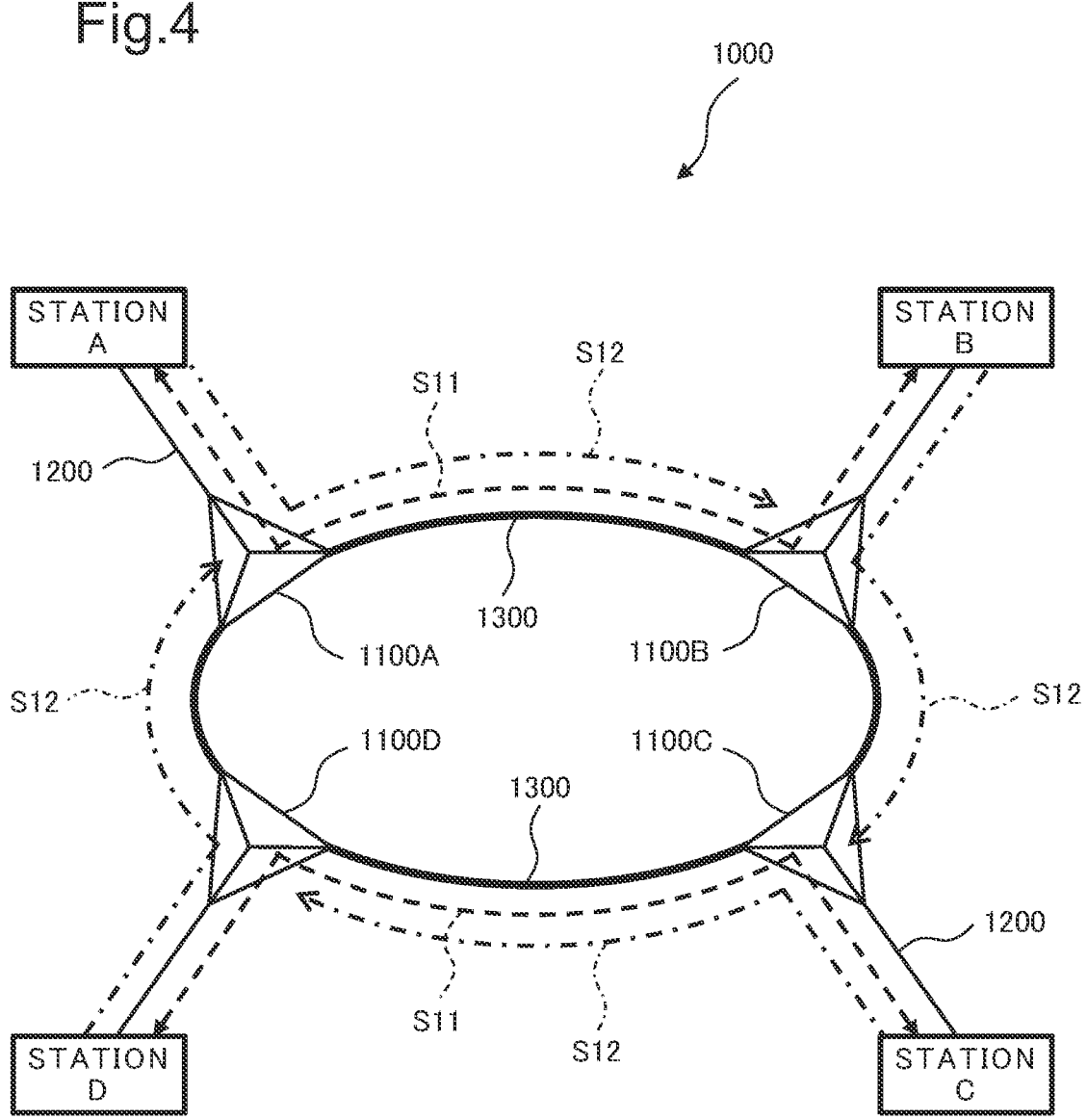
FIG. 4 is a diagram illustrating a configuration of an optical transmission system including the path switching device of the present disclosure.

FIG. 4 illustrates a configuration of an optical transmission system 1000 including the path switching device according to the present example embodiment. As the path switching device, any one of the path switching device 101 and the path switching device 102 that are described above may be used. FIG. 4 illustrates, as an example, a configuration in which the optical transmission system 1000 includes a path switching device 1100A, a path switching device 1100B, a path switching device 1100C, and a path switching device 1100D.

Figure 11A:
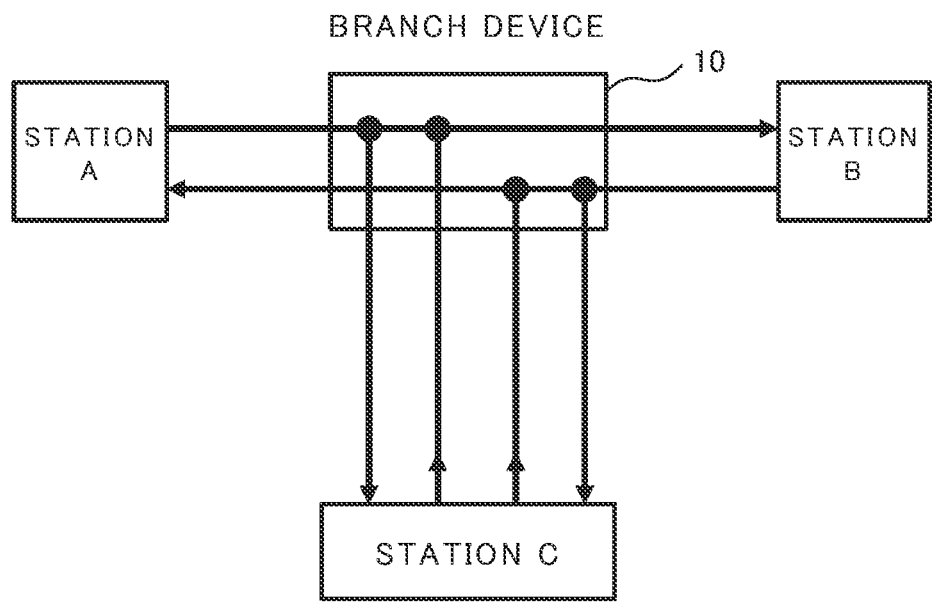
FIG. 11A is a diagram illustrating a configuration of an optical transmission system in the related art.
Figure 11B:
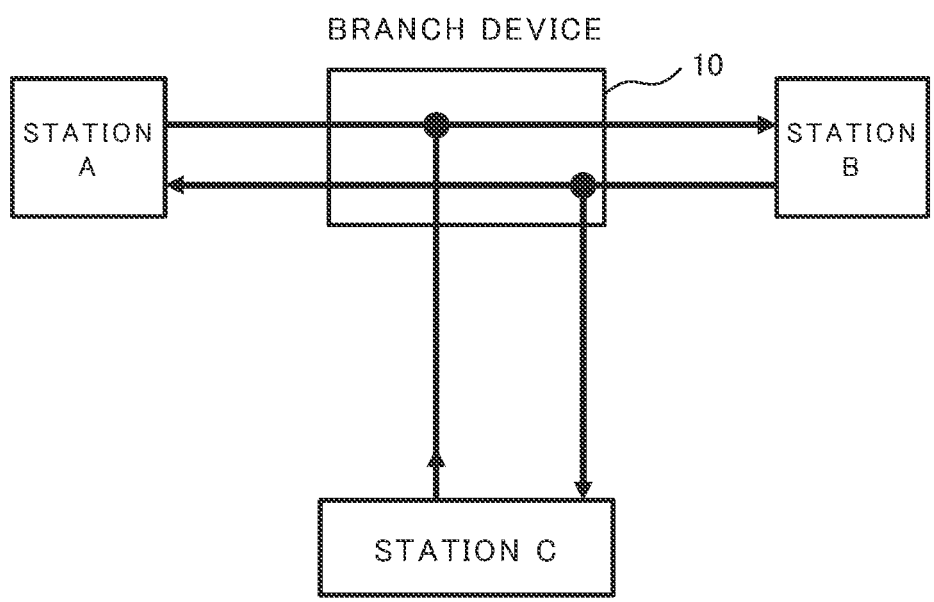
FIG. 11B is a diagram illustrating another configuration of the optical transmission system in the related art.
Figure 12:
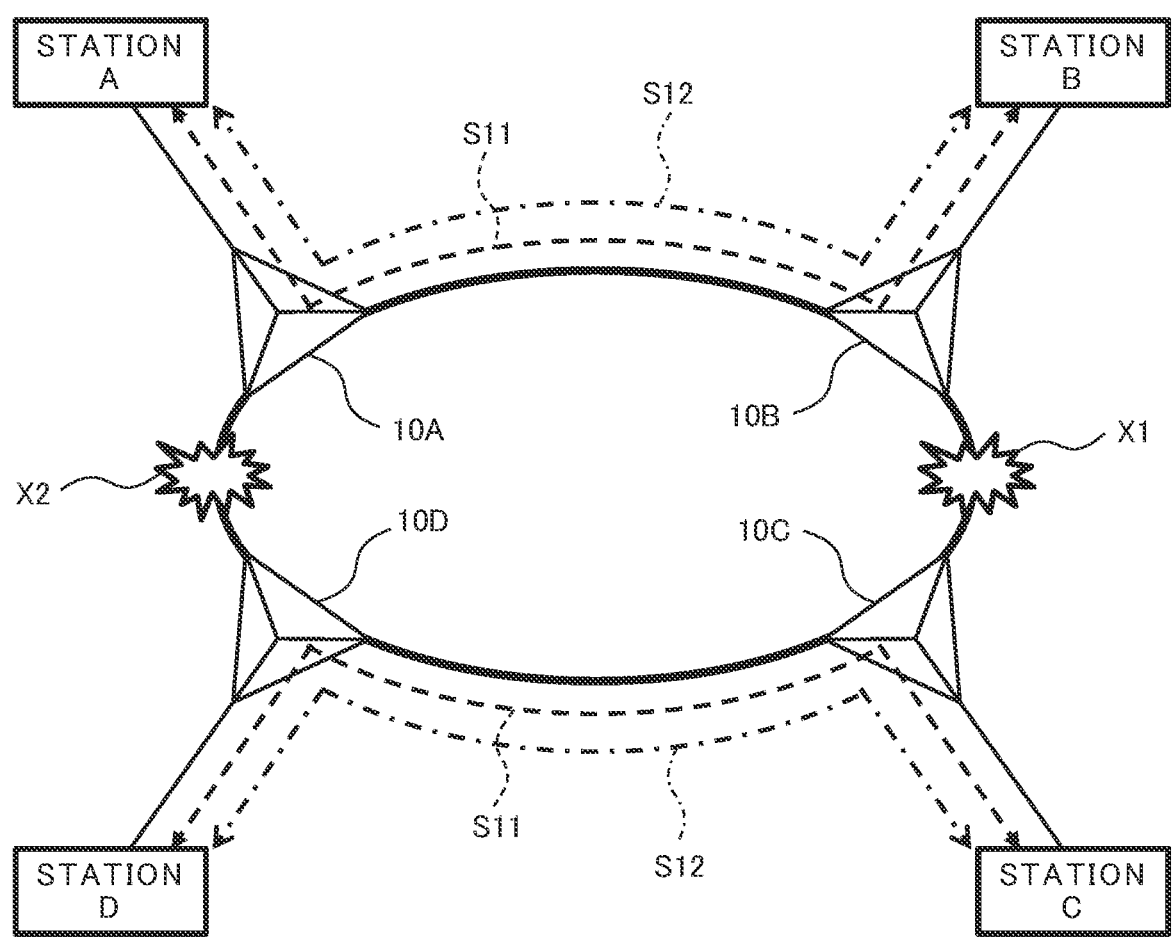
FIG. 12 is a diagram illustrating another different configuration of the optical transmission system in the related art.

The optical transmission system 1000 further includes a branch optical transmission path 1200 and a trunk optical transmission path 1300. Herein, the branch optical transmission path 1200 is formed of one fiber pair. In other words, each of the branch optical transmission paths 1200 between the path switching device 1100A and a station A, the path switching device 1100B and a station B, the path switching device 1100C and a station C, and the path switching device 1100D and a station D is not redundant (see FIG. 11B). Further, the trunk optical transmission path 1300 forms a ring network.

As described above, the path switching devices 1100A, 1100B, 1100C, and 1100D are configured to wavelength-separate the signal light S11 and the monitoring light S12 and set the path of the monitoring light S12 to one path regardless of a switching state of the path of the signal light S11. Thus, for example, even when the station B communicates with the station A with the signal light S11 as illustrated in FIG. 4, the path switching device 1100B is capable of transmitting the monitoring light S12 from the station B to the station C. As a result, a state of the optical transmission path between the station B and the station C can be monitored.

Herein, when the path switching device 102 described above is used as the path switching devices 1100A, 1100B, 1100C, and 1100D, the variable attenuators 131 and 132 are capable of setting any one of the first path and the second path to the transmitting state and setting another one to the blocking state. Thus, the path of the monitoring light S12 can be switched. Specifically, for example, the path of the monitoring light S12 can be switched from clockwise to counterclockwise or from counterclockwise to clockwise in the ring network.

Figure 5:
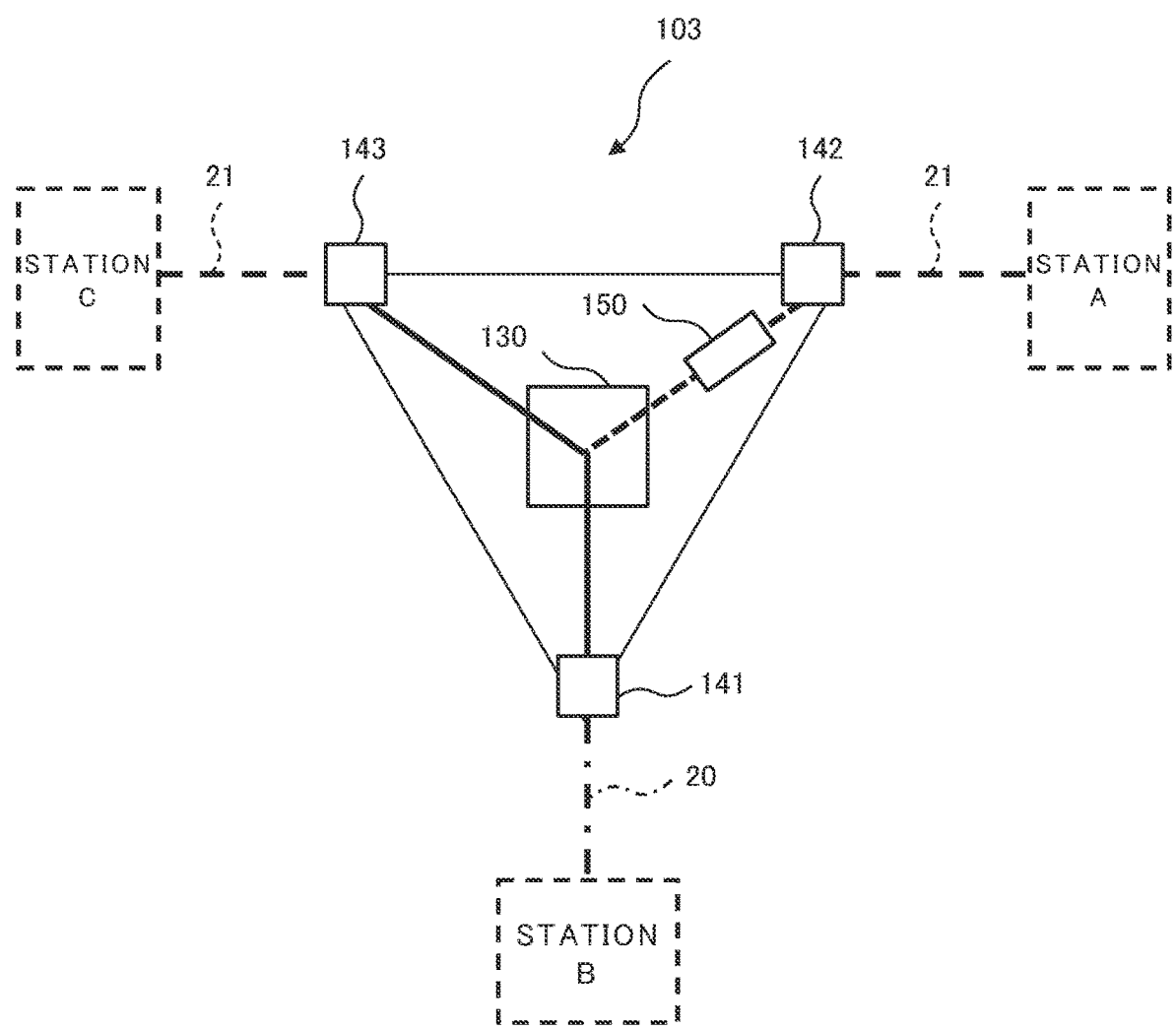
FIG. 5 is a diagram schematically illustrating another different configuration of the path switching device of the present disclosure.

Further, as in a path switching device 103 illustrated in FIG. 5, there may be adopted a configuration further including a wavelength selection reflector 150 that only reflects the monitoring light S12. When the monitoring light path controller 130 sets the path of the monitoring light S12 to the second path (the path between the first connector 141 and the third connector 143) as illustrated in FIG. 5, the wavelength selection reflector 150 may be configured to be positioned in the second connector 142. Further, when the monitoring light path controller 130 sets the path of the monitoring light S12 to the first path (the path between the first connector 141 and the second connector 142), the wavelength selection reflector 150 may be configured to be positioned in the third connector 143. In general, a wavelength selection reflection filter may be used as the wavelength selection reflector 150.

Figure 6:
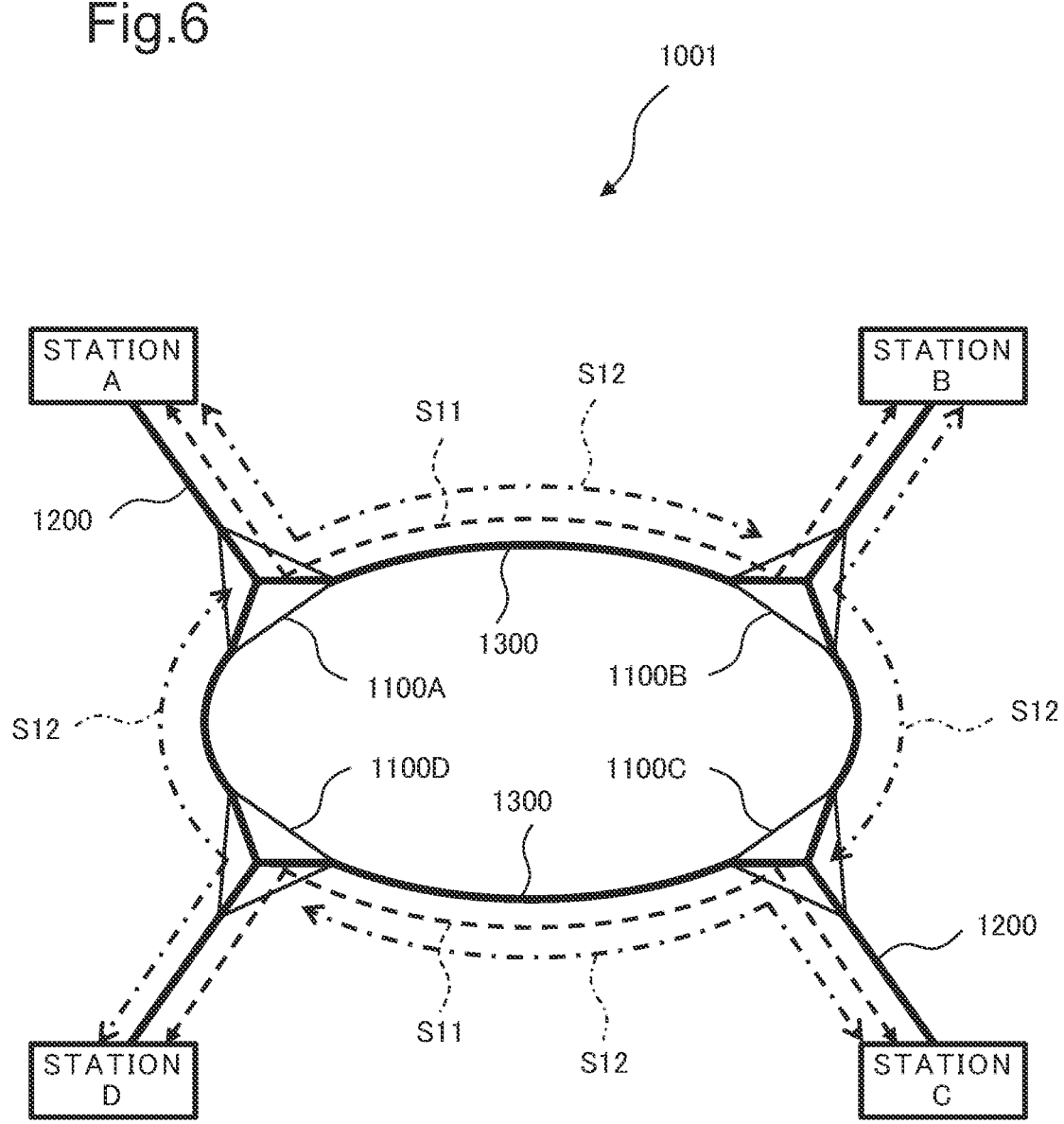
FIG. 6 is a diagram illustrating a path of monitoring light in the optical transmission system when the path switching device of the present disclosure includes another different configuration.

FIG. 6 illustrates a path of the monitoring light S12 in an optical transmission system 1001 using the path switching devices 103 as the path switching devices 1100A, 1100B, 1100C, and 1100D. As illustrated in the drawing, in the optical transmission system 1001, the monitoring light S12 loops back to an opposing line of the trunk optical transmission path 1300. As a result, in optical time domain reflectometer (OTDR) measurement, two opposing lines (fiber pair) can be measured.

Figure 7:
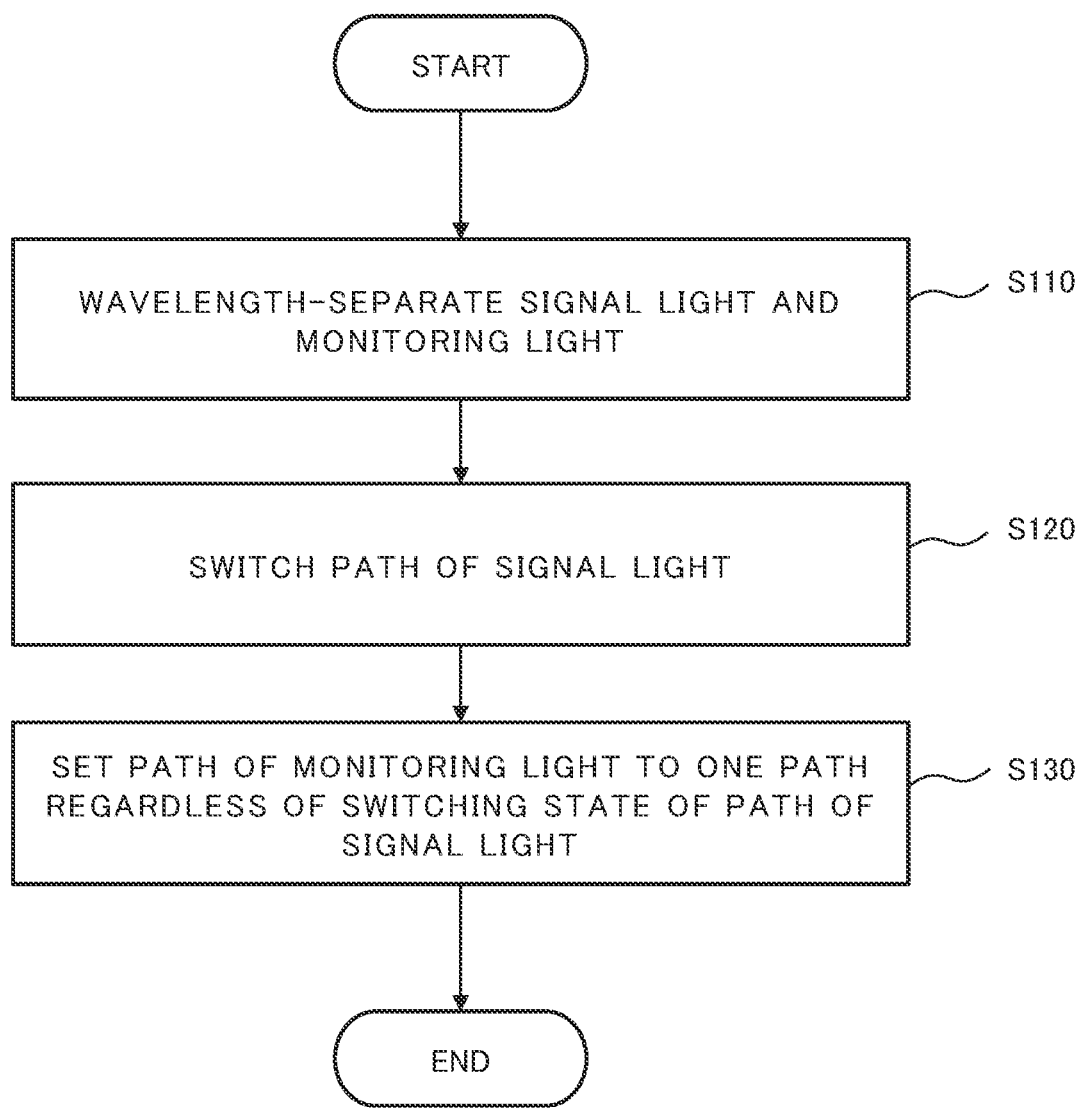
FIG. 7 is a flowchart for describing a path switching method of the present disclosure.

Next, with reference to a flowchart illustrated in FIG. 7, a path switching method according to the present example embodiment is described.

In the path switching method according to the present example embodiment, first, the signal light and monitoring light having a wavelength different from a wavelength of the signal light are wavelength-separated (step S110). Further, the path of the signal light is switched (step S120). Moreover, the path of the monitoring light is controlled. Herein, controlling the path of the monitoring light includes setting the path of the monitoring light to one path regardless of a switching state of the path of the signal light (step S130).

In this manner, in the path switching method according to the present example embodiment, there is adopted a configuration in which the signal light and the monitoring light are wavelength-separated and the path of the monitoring light is set to one path regardless of a switching state of the path of the signal light. Thus, according to the path switching method of the present example embodiment, the optical transmission path can be monitored regardless of a selection state of the transmission path of the signal light in the optical transmission system.

Controlling the path of the monitoring light may include setting the path of the monitoring light to any one of the first path, the second path, and the third path. Herein, the first path is the path between the one end of the branch optical transmission path and the one end of the trunk optical transmission path. The second path is the path between the one end of the branch optical transmission path and another end of the trunk optical transmission path. Further, the third path is the path between the one end of the trunk optical transmission path and another end of the trunk optical transmission path.

Controlling the path of the monitoring light may include connecting any one of the one end of the trunk optical transmission path and another end of the trunk optical transmission path to the one end of the branch optical transmission path. Alternatively, any one of the first path and the second path may be set to the transmitting state for transmitting the monitoring light, another one of the first path and the second path may be set to the blocking state for blocking the monitoring light, and the third path may be set to the blocking state.

Moreover, controlling the path of the monitoring light may include setting the path of the monitoring light to the first path, and only reflecting the monitoring light at another end of the trunk optical transmission path. Alternatively, the path of the monitoring light may be set to the second path, and only the monitoring light may be reflected at the one end of the trunk optical transmission path.

As described above, according to the path switching devices 100, 101, 102, and 103, the optical transmission systems 1000 and 1001, and the path switching method of the present example embodiment, the optical transmission path can be monitored regardless of a selection state of the transmission path of the signal light in the optical transmission system.

Second Example Embodiment

Figure 8:
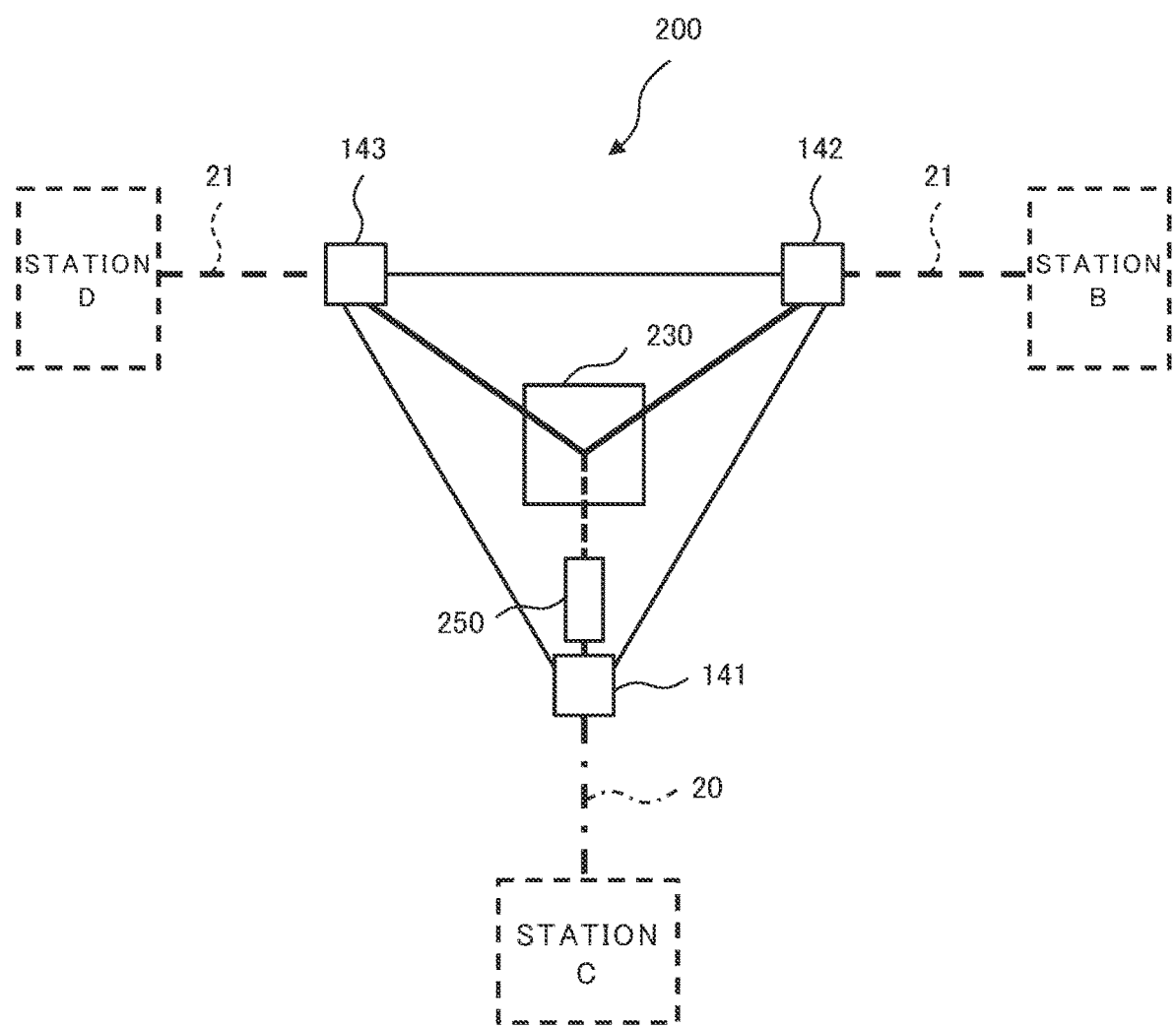
FIG. 8 is a diagram schematically illustrating a configuration of the path switching device of the present disclosure.

Next, a second example embodiment of the present disclosure is described. A path switching device 200 according to the present example embodiment includes a wavelength separator, a signal light path switcher, and a monitoring light path controller 230. The path switching device 200 is suitably used in a submarine optical transmission system. FIG. 8 schematically illustrates a configuration of the path switching device 200 according to the present disclosure. In FIG. 8, illustration of the wavelength separator and the signal light path switcher is omitted.

The wavelength separator wavelength-separates signal light and monitoring light having a wavelength different from a wavelength of the signal light. The signal light path switcher switches a path of the signal light. Further, the monitoring light path controller 230 controls a path of the monitoring light. Herein, the monitoring light path controller 230 sets the path of the monitoring light to one path regardless of a switching state of the path of the signal light.

In this manner, the path switching device 200 according to the present example embodiment is configured to wavelength-separate the signal light and the monitoring light and set the path of the monitoring light to one path regardless of a switching state of the path of the signal light. Thus, according to the path switching device 200 of the present example embodiment, the optical transmission path can be monitored regardless of a selection state of the transmission path of the signal light in the optical transmission system.

The path switching device 200 further includes the first connector 141, the second first connector 142, and the third connector 143. Herein, the first connector 141 is connected to the branch optical transmission path 20. The second connector 142 is connected to the one end of the trunk optical transmission path 21. Further, the third connector 143 is connected to another end of the trunk optical transmission path 21.

In this case, the monitoring light path controller 230 may be configured to set the path of the monitoring light to any one of the first path, the second path, and the third path. Herein, the first path is a path between the first connector 141 and the second connector 142. The second path is a path between the first connector 141 and the third connector 143. Further, the third path is a path between the second connector 142 and the third connector 143.

The configuration described above is similar to the configuration of the path switching device 101 according to the first example embodiment. The path switching device 200 according to the present example embodiment further includes a monitoring light reflector 250 that is positioned in the first connector 141 and reflects the monitoring light propagating in the branch optical transmission path 20. Further, the monitoring light path controller 230 is configured to set the path of the monitoring light to the third path (the path between the second connector 142 and the third connector 143).

The monitoring light path controller 230 may be configured to include an optical coupler that connects the second connector 142 and the third connector 143 to each other. In general, a coupler may be used as the optical coupler.

Further, the monitoring light path controller 230 may be configured to include a variable attenuator that controls the path of the monitoring light to any one of the transmitting state for transmitting the monitoring light and the blocking state for blocking the monitoring light. Herein, the variable attenuator sets the first path to the blocking state, sets the second path to the blocking state, and sets the third path to the transmitting state. In general, a variable attenuator may be used as the variable attenuator.

Figure 9:
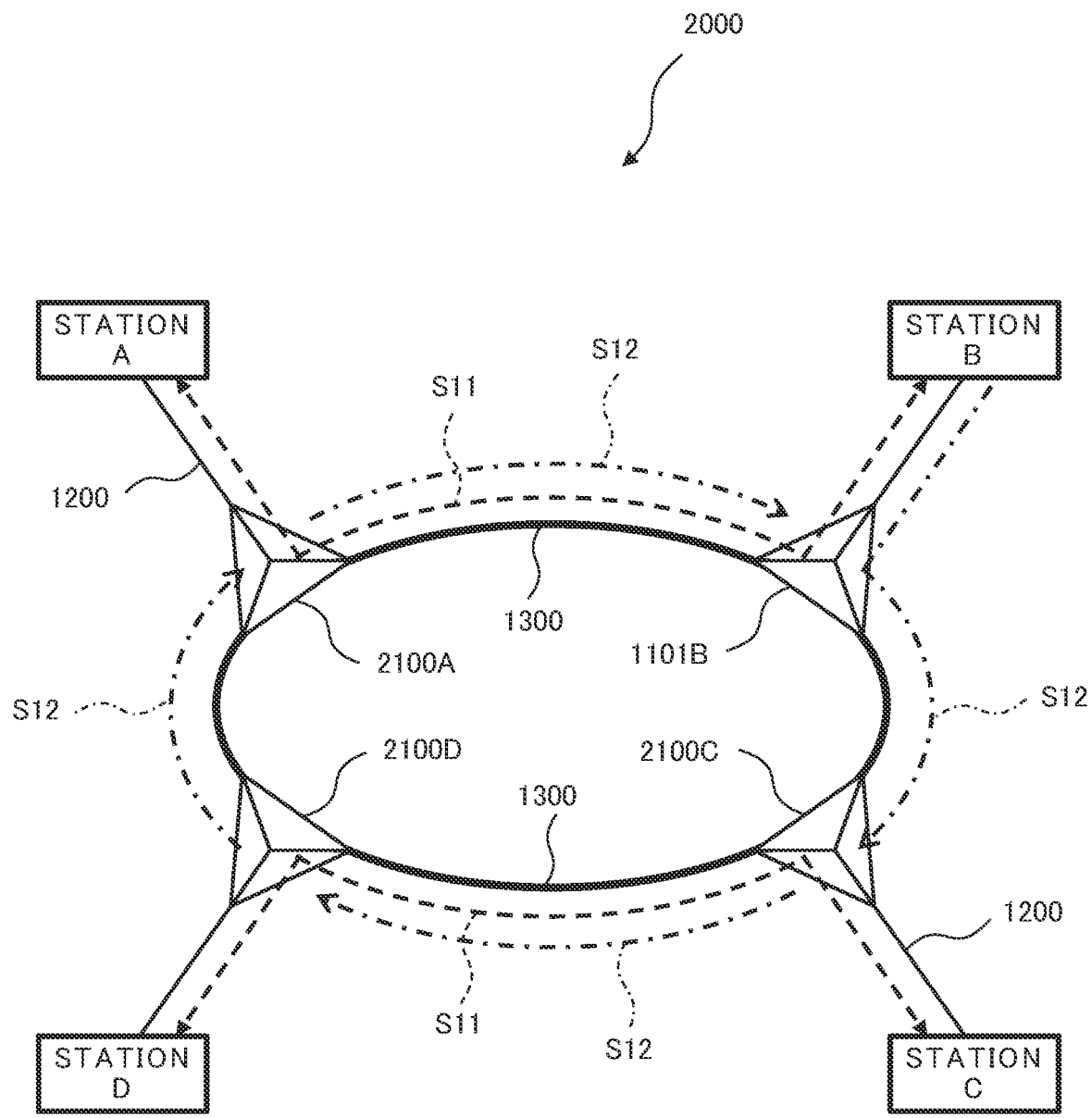
FIG. 9 is a diagram illustrating a configuration of an optical transmission system including the path switching device of the present disclosure.

FIG. 9 illustrates a configuration of an optical transmission system 2000 according to the present example embodiment. The optical transmission system 2000 includes a first path switching device being the path switching device 101 or the path switching device 102 according to the first example embodiment and a second path switching device being the path switching device 200 according to the present example embodiment. FIG. 9 illustrates, as an example, a configuration in which the optical transmission system 2000 includes a first path switching device 1101B, and a second path switching device 2100A, a second path switching device 2100C, and a second path switching device 2100D.

The optical transmission system 2000 further includes the branch optical transmission path 1200 and the trunk optical transmission path 1300.

As illustrated in FIG. 9, in the optical transmission system 2000, the monitoring light S12 is introduced into the trunk optical transmission path 1300 from the station B via the first path switching device 1101B. Then, the monitoring light S12 passes through each of the second path switching device 2100C, the second path switching device 2100D, and the second path switching device 2100A, and travels around the ring network. With this, a state of the trunk optical transmission path 1300 can be monitored with the monitoring light S12. Meanwhile, each of the second path switching device 2100C, the second path switching device 2100D, and the second path switching device 2100A includes the monitoring light reflector 250 that reflects the monitoring light propagating in the branch optical transmission path 20 (see FIG. 8). With this, a state of the branch optical transmission path 20 can also be monitored. Therefore, according to the optical transmission system 2000 of the present example embodiment, the optical transmission path can be monitored regardless of a selection state of the transmission path of the signal light.

Next, with reference to a flowchart illustrated in FIG. 10, a path switching method according to the present example embodiment is described.

In the path switching method according to the present example embodiment, first, the signal light and monitoring light having a wavelength different from a wavelength of the signal light are wavelength-separated (step S110). Further, the path of the signal light is switched (step S120). Moreover, the path of the monitoring light is controlled. Herein, controlling the path of the monitoring light includes setting the path of the monitoring light to one path regardless of a switching state of the path of the signal light.

Further, controlling the path of the monitoring light may include setting the path of the monitoring light to any one of the first path, the second path, and the third path. Herein, the first path is the path between the one end of the branch optical transmission path and the one end of the trunk optical transmission path. The second path is the path between the one end of the branch optical transmission path and another end of the trunk optical transmission path. Further, the third path is the path between the one end of the trunk optical transmission path and another end of the trunk optical transmission path.

The steps described above are similar to the steps in the path switching method according to the first example embodiment. In the path switching method of the present example embodiment, there is adopted a configuration in which the path of the monitoring light is set to the third path and the monitoring light propagating in the branch optical transmission path is reflected at the one end of the branch optical transmission path. In other words, the monitoring light propagating in the trunk optical transmission path is transmitted, and the monitoring light propagating in the branch optical transmission path is reflected (step S230).

In this manner, in the path switching method according to the present example embodiment, there is adopted a configuration in which the signal light and the monitoring light are wavelength-separated, and the monitoring light propagating in the trunk optical transmission path is transmitted and the monitoring light propagating in the branch optical transmission path is reflected regardless of a switching state of the path of the signal light. Thus, according to the path switching method of the present example embodiment, the optical transmission path can be monitored regardless of a selection state of the transmission path of the signal light in the optical transmission system.

Controlling the path of the monitoring light may include connecting the one end of the trunk optical transmission path and another end of the trunk optical transmission path to each other. Further, controlling the path of the monitoring light may include setting the first path to the blocking state for blocking the monitoring light, setting the second path to the blocking state, and setting the third path to the transmitting state for transmitting the monitoring light.

As described above, according to the path switching device 200, the optical transmission system 2000, and the path switching method of the present example embodiment, the optical transmission path can be monitored regardless of a selection state of the transmission path of the signal light in the optical transmission system.

The whole or part of the example embodiments disclosed above can be described as, but not limited to, the following supplementary notes.

(Supplementary Note 1) A path switching device including a wavelength separator for wavelength-separating signal light and monitoring light having a wavelength different from a wavelength of the signal light, a signal light path switcher for switching a path of the signal light, and a monitoring light path controller for controlling a path of the monitoring light, wherein the monitoring light path controller sets a path of the monitoring light to one path regardless of a switching state of a path of the signal light.

(Supplementary Note 2) The path switching device according to Supplementary Note 1, further including a first connector for being connected to a branch optical transmission path, a second connector for being connected to one end of a trunk optical transmission path, and a third connector for being connected to another end of the trunk optical transmission path, wherein the monitoring light path controller sets a path of the monitoring light to any one of a first path between the first connector and the second connector, a second path between the first connector and the third connector, and a third path between the second connector and the third connector.

(Supplementary Note 3) The path switching device according to Supplementary Note 2, wherein the monitoring light path controller includes an optical coupler for connecting any one of the second connector and the third connector with the first connector.

(Supplementary Note 4) The path switching device according to Supplementary Note 2, wherein the monitoring light path controller includes a variable attenuator for controlling a path of the monitoring light to any one of a transmitting state for transmitting the monitoring light and a blocking state for blocking the monitoring light, and the variable attenuator sets any one of the first path and the second path to the transmitting state, sets another one of the first path and the second path to the blocking state, and sets the third path to the blocking state.

(Supplementary Note 5) The path switching device according to any one of Supplementary Notes 2 to 4, further including a wavelength selection reflector for reflecting only the monitoring light, wherein the wavelength selection reflector is positioned in the third connector when the monitoring light path controller sets a path of the monitoring light to the first path, and is positioned in the second connector when the monitoring light path controller sets a path of the monitoring light to the second path.

(Supplementary Note 6) The path switching device according to Supplementary Note 2, further including a monitoring light reflector for reflecting the monitoring light propagating in the branch optical transmission path, the monitoring light reflector being positioned in the first connector, wherein the monitoring light path controller sets a path of the monitoring light to the third path.

(Supplementary Note 7) The path switching device according to Supplementary Note 6, wherein the monitoring light path controller includes an optical coupler for connecting the second connector and the third connector to each other.

(Supplementary Note 8) The path switching device according to Supplementary Note 6, wherein the monitoring light path controller includes a variable attenuator for controlling a path of the monitoring light to any one of a transmitting state for transmitting the monitoring light and a blocking state for blocking the monitoring light, and the variable attenuator sets the first path to the blocking state, sets the second path to the blocking state, and sets the third path to the transmitting state.

(Supplementary Note 9) A path switching method including wavelength-separating signal light and monitoring light having a wavelength different from a wavelength of the signal light, switching a path of the signal light, and controlling a path of the monitoring light, wherein the controlling a path of the monitoring light includes setting a path of the monitoring light to one path regardless of a switching state of a path of the signal light.

(Supplementary Note 10) The path switching method according to Supplementary Note 9, wherein the controlling a path of the monitoring light includes setting a path of the monitoring light to any one of a first path between one end of a branch optical transmission path and one end of a trunk optical transmission path, a second path between the one end of the branch optical transmission path and another end of the trunk optical transmission path, and a third path between the one end of the trunk optical transmission path and the another end of the trunk optical transmission path.

(Supplementary Note 11) The path switching method according to Supplementary Note 10, wherein the controlling a path of the monitoring light includes connecting any one of one end of the trunk optical transmission path and another end of the trunk optical transmission path with one end of the branch optical transmission path.

(Supplementary Note 12) The path switching method according to Supplementary Note 10, wherein the controlling a path of the monitoring light includes setting any one of the first path and the second path to a transmitting state for transmitting the monitoring light, setting another one of the first path and the second path to a blocking state for blocking the monitoring light, and setting the third path to the blocking state.

(Supplementary Note 13) The path switching method according to any one of Supplementary Notes 10 to 12, wherein the controlling a path of the monitoring light includes any one of setting a path of the monitoring light to the first path and reflecting only the monitoring light at another end of the trunk optical transmission path, and setting a path of the monitoring light to the second path and reflecting only the monitoring light at one end of the trunk optical transmission path, (Supplementary Note 14) The path switching method according to Supplementary Note 10, wherein the controlling a path of the monitoring light includes setting a path of the monitoring light to the third path, and reflecting, at one end of the branch optical transmission path, the monitoring light propagating in the branch optical transmission path.

(Supplementary Note 15) The path switching method according to Supplementary Note 14, wherein the controlling a path of the monitoring light includes connecting one end of the trunk optical transmission path and another end of the trunk optical transmission path to each other.

(Supplementary Note 16) The path switching method according to Supplementary Note 14, wherein the controlling a path of the monitoring light includes setting the first path to a blocking state for blocking the monitoring light, setting the second path to the blocking state, and setting the third path to a transmitting state for transmitting the monitoring light.

(Supplementary Note 17) An optical transmission system including the path switching device according to Supplementary Note 3 or 4, the branch optical transmission path, and the trunk optical transmission path.

(Supplementary Note 18) An optical transmission system including a first path switching device being the path switching device according to Supplementary Note 3 or 4, a second path switching device being the path switching device according to Supplementary Note 6 or 7, the branch optical transmission path, and the trunk optical transmission path.

(Supplementary Note 19) The optical transmission system according to Supplementary Note 17 or 18, wherein the trunk optical transmission path forms a ring network.

(Supplementary Note 20) The optical transmission system according to Supplementary Note 17 or 18, wherein the branch optical transmission path is formed of one fiber pair.

The previous description of embodiments is provided to enable a person skilled in the art to make and use the present disclosure. Moreover, various modifications to these example embodiments will be readily apparent to those skilled in the art, and the generic principles and specific examples defined herein may be applied to other embodiments without the use of inventive faculty. Therefore, the present disclosure is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A path switching device comprising:
    a wavelength separator configured to wavelength-separates signal light and monitoring light having a wavelength different from a wavelength of the signal light;
    a signal light path switcher configured to switch a path of the signal light; and
    a monitoring light path controller comprising:
    a memory storing instructions; and
    a processor connected to the memory and configured to execute the instructions to
    control a path of the monitoring light by setting a path of the monitoring light to one path regardless of a switching state of a path of the signal light.

2. The path switching device according to claim 1, further comprising:
    a first connector connected to a branch optical transmission path;
    a second connector connected to one end of a trunk optical transmission path; and
    a third connector connected to another end of the trunk optical transmission path, wherein
    the processor is configured to execute the instructions to
    set a path of the monitoring light to any one of a first path between the first connector and the second connector, a second path between the first connector and the third connector, and a third path between the second connector and the third connector.

3. The path switching device according to claim 2, wherein
    the monitoring light path controller includes optical coupler configured to connect any one of the second connector and the third connector with the first connector.

4. The path switching device according to claim 2, wherein
    the monitoring light path controller includes variable attenuator configured to control a path of the monitoring light to any one of a transmitting state for transmitting the monitoring light and a block state for blocking the monitoring light, and wherein
    the variable attenuator is configured to
    set any one of the first path and the second path to the transmitting state,
    set another one of the first path and the second path to the blocking state, and
    set the third path to the blocking state.

5. The path switching device according to claim 2, further comprising:
    wavelength selection reflector configured to reflect only the monitoring light, wherein
    the wavelength selection reflector
    is positioned in the third connector when the monitoring light path controller sets a path of the monitoring light to the first path, and
    is positioned in the second connector when the monitoring light path controller sets a path of the monitoring light to the second path.

6. The path switching device according to claim 2, further comprising:
    monitoring light reflector configured to reflect the monitoring light propagating in the branch optical transmission path, the monitoring light reflector being positioned in the first connector, wherein
    the monitoring light path controller is configured to set a path of the monitoring light to the third path.

7. The path switching device according to claim 6, wherein
    the monitoring light path controller includes optical coupler configured to connect the second connector and the third connector to each other.

8. The path switching device according to claim 6, wherein
    the monitoring light path controller includes variable attenuator configured to control a path of the monitoring light to any one of a transmitting state for transmitting the monitoring light and a blocking state for blocking the monitoring light, and
    the variable attenuator is configured to
    set the first path to the blocking state,
    set the second path to the blocking state, and
    set the third path to the transmitting state.

9. An optical transmission system including the path switching device according to claim 3,
    the branch optical transmission path, and
    the trunk optical transmission path.

10. The optical transmission system according to claim 9, wherein
    the trunk optical transmission path forms a ring network.

11. The optical transmission system according to claim 9, wherein
    the branch optical transmission path is formed of one fiber pair.

12. A path switching method executed by a computer, the method comprising:
    wavelength-separating signal light and monitoring light having a wavelength different from a wavelength of the signal light;
    switching a path of the signal light; and
    controlling a path of the monitoring light by setting a path of the monitoring light to one path regardless of a switching state of a path of the signal light.

13. The path switching method according to claim 9, wherein
    the controlling a path of the monitoring light includes setting a path of the monitoring light to any one of a first path between one end of a branch optical transmission path and one end of a trunk optical transmission path, a second path between the one end of the branch optical transmission path and another end of the trunk optical transmission path, and a third path between the one end of the trunk optical transmission path and the another end of the trunk optical transmission path.

* * * * *